United States Patent [19]
Lyman et al.

[11] Patent Number: 5,819,825
[45] Date of Patent: Oct. 13, 1998

[54] INTERCHANGEABLE CHIPPER ATTACHMENT FOR A HOG

[75] Inventors: Mark Gerlinger Lyman; Ronald Gordon Lyman; Steven Eric Hitchcock; John Edward Burke, all of Salem, Oreg.

[73] Assignee: West Salem Machinery, Salem, Oreg.

[21] Appl. No.: 863,528

[22] Filed: May 27, 1997

[51] Int. Cl.$^6$ .............................. B27L 11/02; B27G 13/04
[52] U.S. Cl. ....................... 144/174; 144/162.1; 144/172; 144/230; 144/241; 144/229; 241/194; 241/197
[58] Field of Search ................................. 144/162.1, 172, 144/174, 176, 218, 231, 236, 229, 230, 241; 241/191, 194, 197, 300; 407/46, 47, 102

[56] References Cited

U.S. PATENT DOCUMENTS

| | | |
|---|---|---|
| 3,186,277 | 6/1965 | Brunner . |
| 3,675,693 | 7/1972 | I'Anson . |
| 3,749,325 | 7/1973 | Maier . |
| 3,854,511 | 12/1974 | Maier . |
| 3,860,051 | 1/1975 | Anson . |
| 4,161,294 | 7/1979 | Lautenschlager et al. ............. 241/191 |
| 4,771,953 | 9/1988 | Morey . |
| 4,998,574 | 3/1991 | Beach et al. . |
| 5,005,620 | 4/1991 | Morey . |
| 5,054,703 | 10/1991 | Morey . |
| 5,070,920 | 12/1991 | Morey . |
| 5,146,963 | 9/1992 | Carpenter et al. ....................... 144/229 |
| 5,211,212 | 5/1993 | Carlson et al. . |
| 5,285,974 | 2/1994 | Cesarini ................................. 241/194 |
| 5,363,891 | 11/1994 | Plante . |
| 5,611,496 | 3/1997 | Fleenor .................................. 241/197 |

OTHER PUBLICATIONS

*Horizontal Wood & Bark Hogs*, West Salem Machinery Company.
*Wood & Bark Hogs*, West Salem Machinery Company.
*WSM Pallet & Wood Waste Hogging Systems*, West Salem Machinery Company.
*WSM Introduces the "Power Rotor"*, West Salem Machinery Company.
*WSM Wood & Yard Waste Recycling System*, West Salem Machinery Company.
*WSM High Inertia Hog*, West Salem Machinery Company.

*Primary Examiner*—W. Donald Bray
*Attorney, Agent, or Firm*—Klarquist Sparkman Campbell Leigh & Whinston

[57] ABSTRACT

An interchangeable chipper tool attachment for a hog allows a hog machine to operate as either a hog or a chipper. An operator of the hog machine can remove hammer tools used in the hog and replace them with the chipper attachment. The chipper attachment includes knife receiving area, a knife support receiving area, and a fastener portion for mounting the tool holder to rotor disks on the rotor assembly of the hog machine. A knife assembly, including a chipper knife, is coupled to the tool holder at the knife receiving area and points in the direction of rotation of the rotor. A knife support block supports the chipper knife and is coupled to the tool holder at the knife support receiving area, a lateral face of the tool holder adjacent to the knife receiving area. When mounted in an interleaved fashion between the rotor disks of the rotor assembly, the chipper knife rotates in a circular path and produces chips by cutting wood waste against an anvil on the hog. To accommodate the tighter tolerances of the chipper, the anvil can be adjustable so that the operator can increase or decrease the distance between the path of the chipper blade and the edge of the anvil.

12 Claims, 5 Drawing Sheets

INTERCHANGEABLE CHIPPER ATTACHMENT FOR A HOG

FIELD OF THE INVENTION

The invention relates to wood reduction machines and more specifically relates to a cutting tool for a chipper/hog machine.

BACKGROUND OF THE INVENTION

Wood reduction machines, such as chippers and hogs, are designed to reduce wood waste into a useable wood fiber product. Chippers are equipped with cutting knives to cut wood waste into chips. Hogs, on the other hand, are equipped with a hammer tool to grind wood into splintered wood fibers. The output of a chipper has a higher value because it consists of higher quality chips that can be used for a wider variety of applications, including paper-making. However, chippers are usually limited to applications where the wood waste product does not contain rock or metal, which damages the chipper knives. A hog can be used to grind a variety of wood waste into a wood fiber product. Since the output of a hog consists of lower quality splintered fibers, it typically is not used for applications such as paper-making, and as such, is not as valuable as the output of a chipper.

With the increasing focus on recycling wood product, there is a growing demand for wood reduction equipment to convert different types of wood waste into usable wood fiber. In the past, wood waste from construction, yard debris, etc. was often discarded rather than recycled. Now, there is more of a demand for recycled wood products, and more waste wood is being recycled even if it is lower quality. To maximize the value of the recycled product, it is advantageous to have the capability to have both a chipper for creating higher quality wood chips when possible, and a hog for grinding lower quality waste. Due to the cost of chipper and hog machines, it can be very costly to maintain both a chipper and a hog machine. There is a need, therefore, for a more cost effective way to perform both the function of a hog and a chipper.

Figure 1:
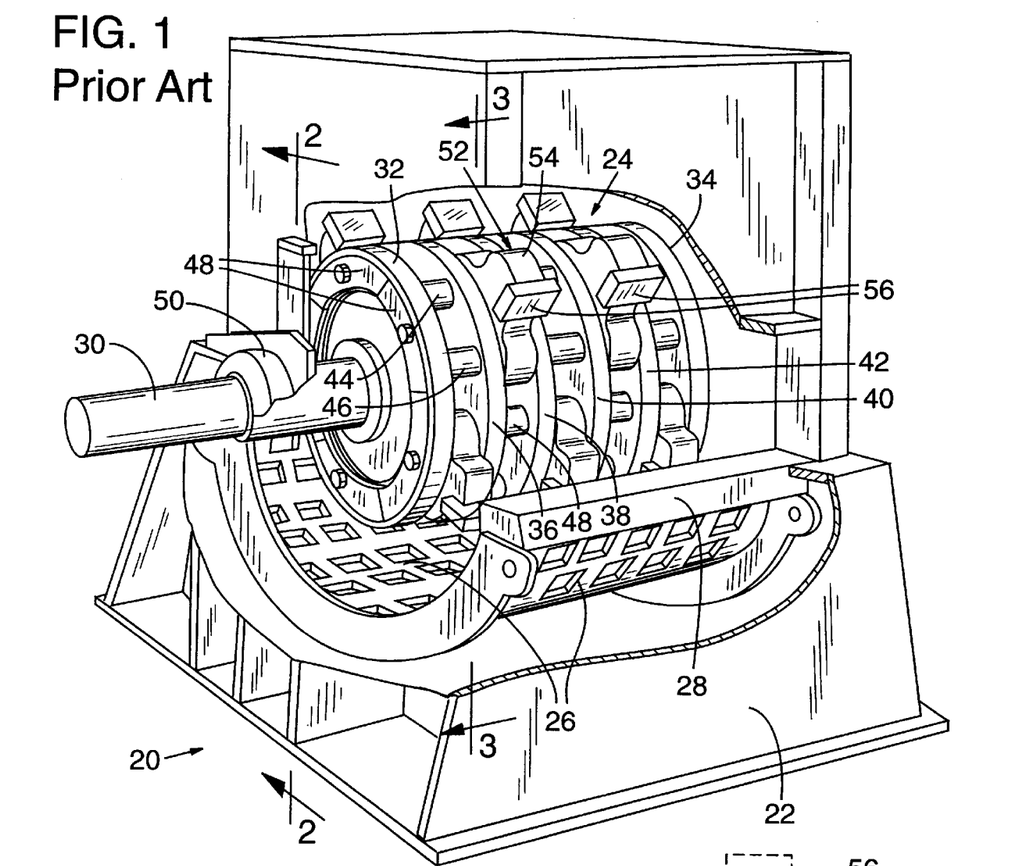
FIG. 1 is a perspective view of an example of a prior art hog machine, with portions broken away for illustrative purposes.

FIG. 1 illustrates a presently known hog 20, designed to grind wood products. The hog shown in FIG. 1 comprises a steel housing 22 portions of which are broken away, enclosing a rotor assembly 24, screen sections 26, and anvil 28. The rotor assembly 24 includes a shaft 30, two end members 32, 34 at opposing ends of the rotor assembly, a series of intermediate rotor members called rotor disks 36, 38, 40, 42, and a series of eight mounting pins (for example, 44, 46) that pass through mounting holes on the rotor disks. In this particular design, each of the rotor disks 36–42, including the end members 32–34 are bored to the size of the shaft, are secured to the shaft with a key, and are held in place via a clamping device (e.g., lock nut and lock washer). The mounting pins (44, 46) are held in place by pin retainers (e.g., pin retainer 48) that are fastened to the end members. For example, in this particular implementation, the pin retainers are retaining plates that are bolted to the end members. The mounting pins can be removed by removing the pin retainers and sliding the pins from the rotor assembly.

The shaft 30 of the rotor assembly rests on bearings inside bearing housings 50 on each end of the hog. The rotor disks 36–42 and end members 32–34 slide onto the shaft 30, and the mounting pins 44, 46 slide through the mounting holes in the rotor disks. Each end of a mounting pin is coupled to an end member 32 of the rotor assembly by a retainer cap 48 that bolts the mounting pin 46 to the end member.

Coupled to the rotor assembly via the mounting pins such as pins 44 and 46, hammer tools 52 are held in place on a mounting pin between a pair of rotor disks (for example, 36 and 38) or an end member on one side and a rotor disk on the other (for example, 32 and 36). The hammer tools 52 each include a hammer tool holder 54 and a replaceable hammer tip 56, attached to the tool holder and facing the direction of rotation.

The hog grinds wood waste by smashing wood waste against the anvil 28 with a hammer tip 56. The hammer tips rotate radially inwardly of anvil 28 and do not contact the anvil. Either swinging or rigid hammer tools can be mounted to the mounting pins in the rotor assembly. A swinging hammer is mounted using a single pin that slides through a tool holder and allows the tool holder to pivot about the axis of the pin. The rigid hammer, on the other hand, is mounted using two pins that slide through corresponding holes in the tool holder and hold it rigidly in place on the rotor assembly. In both the swinging and rigid hammer designs, the tool holders hold a similar replaceable hammer tip. When the rotor assembly rotates, it grinds waste wood between the hammer tip and the anvil located on the body of the hog. Located at the bottom of the hog housing, the screens are designed to allow smaller pieces of wood fiber to pass through the hog where they can be collected.

Figure 2:
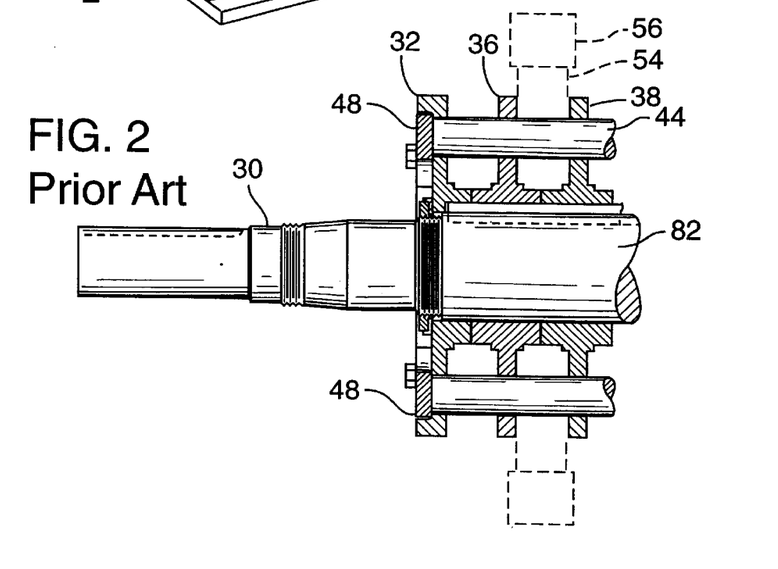
FIG. 2 is a partial cross-sectional view taken along line 2—2 in FIG. 1.

FIG. 2 shows a partial cross-section of the rotor assembly 24 along line 2—2 in FIG. 1. FIG. 2 shows the relationship between the hammer tools and the rotor assembly in more detail. To remove a tool holder, an operator can remove the pin retainers (48, for example) from the end member 32 and slide the pins from the end member and rotor disks. This enables the operator to remove the tool holder 54 of each of the hammer tools 52 from a mounting pin or pins in the rotor assembly by sliding the pin or pins out from the hole or holes on the tool holder.

Conventional chipper machines have a significantly different design than a hog machine. One type of chipper, called a "disk-type" chipper, has a series of knives mounted on the face of a disk. As the disk rotates, the knives on the face of the disk cut wood into wood chips. Another type of chipper, called a "drum-type" chipper, has a cylindrical drum with knives mounted across the face of the drum. Mounted on a rotor assembly, the drum spins about an axis and the knives at its face shear wood waste into wood chips as the wood waste comes in contact with the drum.

Both of these types of chipper machines are designed solely to perform a chipping function. Thus, they can only be used for wood waste of sufficient quality to be fed to the chipper. Similarly, the hog machine described above in the past has been designed solely to perform a grinding function, and therefore, has not been capable of providing more valuable wood chips even if the wood waste is of sufficient quality to do so.

SUMMARY OF THE INVENTION

The invention provides an interchangeable chipper tool attachment that can convert a hog machine into a chipper. The chipper tool attachment is interchangeable in the sense that a machine operator can replace the conventional hammer tools on the hog with the chipper tool attachments. This enables the hog to act as either a hog or a chipper, depending on the type of cutting attachment installed on the rotor assembly of the machine at a given time.

The chipper tool attachment comprises a tool holder, a knife assembly and a knife support block. The tool holder has first and second opposing faces on each side, and lateral faces substantially perpendicular to the first and second opposing faces. The lateral faces include a knife receiving area, where the knife assembly is coupled to the tool holder, and a knife support area, where the knife support block is coupled to the tool holder. The tool holder also includes a fastener portion at the portion of the holder that is connected to the rotor assembly of the converted chipper/hog machine. In one embodiment, this fastener portion comprises a pair of slots or holes that are used to couple the tool holder rigidly to mounting pins on the rotor assembly. The mounting pins serve as securing fasteners to hold the tool holders rigidly on the rotor assembly. This particular design enables an operator to slide the tool holder on and off the rotor assembly to exchange the chipper tool attachment with a hammer attachment or another chipper attachment.

There are a number of possible variations to the chipper tool attachment. For example, the knife assembly can include a knife and knife clamp for removably fastening the knife to the tool holder. The knife clamp can be designed to make the position of the knife edge adjustable relative to the anvil of the hog machine. This enables the operator to adjust the size of the wood chips created when the rotating knife blades shear wood waste against the anvil. The knife support block can also be designed to be replaceable. In one embodiment for example, the knife support block is fastened to the knife support receiving area so that an operator can remove and replace the support block or rotate its orientation on the tool holder.

In one embodiment of the invention adapted for the hog machine shown in FIGS. 1 and 2, the chipper cutting attachments are designed to be interleaved between rotor members in the rotor assembly. To accomplish this, the operator of the hog machine slides the pins from the rotor assembly, pulls off the hammer tools from the assembly, inserts a chipper tool attachment and then slides the pins through the chipper attachment. The chipper cutting attachments are interleaved on the rotor assembly with the rotor members in the sense that the cutting attachments are located between adjacent rotor members. When installed, the knives on the chipper tool attachments generally face toward the direction of rotation of the rotor assembly. As the rotor assembly rotates, it shears wood waste between the chipper blade and an anvil at the hog housing. Preferably for chipper applications, the anvil should be adjustable so that the distance between the circular path of the chipper blade is adjusted to a desired tolerance. The knife assembly on the chipper tool attachment can be adjusted as well to control the position of the knife blade relative to the edge of the anvil.

The chipper tool attachment improves the value of a hog machine because it enables the machine to create more valuable wood chips when the wood waste product is suitable for chipping. The chipper tool is also a low cost alternative to recycling facilities that would otherwise have to maintain both a hog and a chipper machine to have the capability to do both. Further features and advantages of the invention will become apparent with reference to the following detailed description and accompanying drawings.

DETAILED DESCRIPTION

Figure 3:
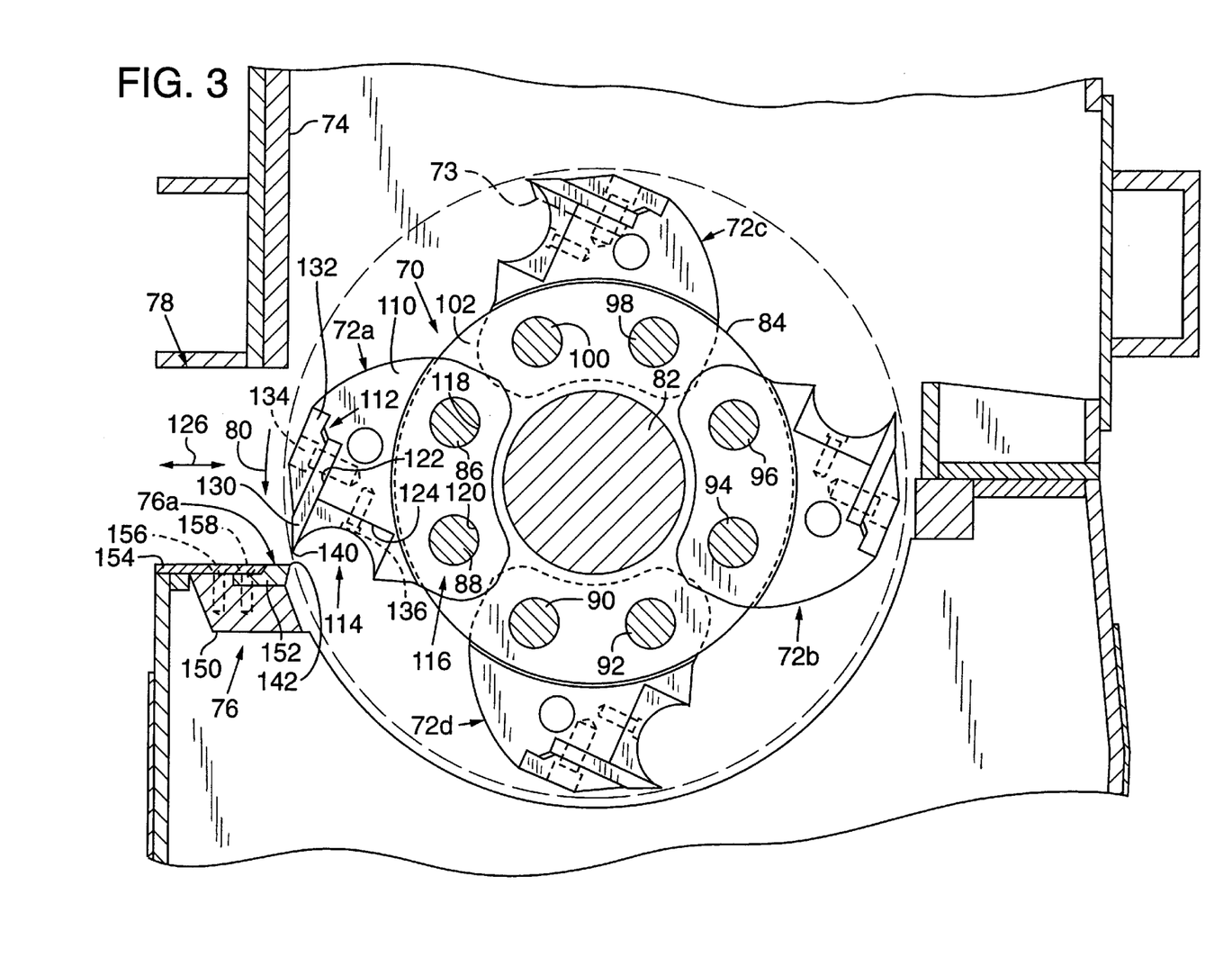
FIG. 3 is a cross-sectional view of the rotor assembly of a hog showing use of an embodiment of interchangeable chipper attachments according to the present invention.

The invention provides an interchangeable chipper cutting attachment for a hog machine. FIG. 3 illustrates a cross-sectional view of the rotor assembly 70 of a hog showing an embodiment of the interchangeable chipper attachment 72*a–d*. The hog shown in FIG. 3 has generally the same design as the one shown in FIGS. 1 and 2. It includes a housing 74, which partially encloses rotor assembly 70. An anvil assembly 76 is positioned near a feed chute 78 of the housing 74 and has a contact surface 76*a* facing in a direction opposing the direction of rotation 80 of the rotor assembly 70. The rotor assembly 70 includes a shaft 82, and a rotor member 84 (of a series of rotor members as shown in FIGS. 1 and 2) which slides onto the shaft 82. In this embodiment, the rotor member is a circular "rotor disk" including holes for mounting pins. However, the specific shape of the rotor member 84 and structure for mounting cutting attachments can vary as long as it supports mounting structures (such as mounting pins) for the cutting attachments and enables an operator to interchange hammer and chipper cutting attachments. The number of rotor members can vary as well, depending on the desired size of the hog.

The rotor member in this hog design has eight mounting holes (102, for example) corresponding to the eight mounting pins (86–100). The mounting pins 86–100 slide through the mounting holes on the rotor members and are aligned in a direction parallel to the axis of rotation of the rotor. In place of the hammer tools shown in FIGS. 1 and 2, the converted chipper machine has at least two chipper cutting attachments coupled between each adjacent pair of the rotor members via the mounting pins (86, 88, 94, and 96 in FIG. 3 ). The chipper attachments between adjacent rotor members are positioned on opposite sides of the rotor assembly to balance the rotor assembly. As shown in FIG. 3, additional pairs of chipper attachments 72*c* and 72*d* are also positioned on opposite sides of the rotor assembly, but are staggered such that adjacent pairs of chipper attachments along the rotor are rotated about 90 degrees.

The chipper cutting attachments such as illustrated at 72*a* each comprise a tool holder 110, a knife assembly 112, and a knife support block 114. A tool holder 110 has a fastener portion 116 for rigidly and removably attaching the tool holder to a mounting structure of the rotor assembly 70. In this particular embodiment, fastener portion 116 comprises first and second holes, or slots, 118, 120. The mounting structure comprises mounting pins 86, 88 that slide through holes 118, 120 on tool holder 110. The specific shape and configuration of fastener portion 116 and the mounting structure on the rotor assembly can vary, as long as the tool holder is held rigidly in place on the rotor assembly during operation and can be removed from the rotor assembly to interchange the tool holder 110.

Each of the tool holders shown in FIG. 3 have a knife receiving area 122 and a knife support receiving area 124. The knife receiving area 122 and knife support area 124 face in a substantially perpendicular direction to the opposing sides of the tool holder 110. The opposing sides of the tool holder 110 are the substantially planar surfaces that face toward the rotor members when mounted in between the rotor members on the rotor assembly of the hog. The knife receiving area 122 forms a relatively flat, planar surface that faces substantially radially of the rotor assembly 70. As shown here, the knife receiving area 122 does not face directly in the radial direction relative to the axis of rotation of the shaft, (i.e., is not tangential to an arc of rotation of the device) but rather is angled slightly outwardly in the direction of rotation. The knife receiving area 122 is adapted to receive a knife assembly 112. In this particular case, the knife assembly 112 includes a chipper knife 130, a knife clamp 132, and a fastener 134 such as a threaded bolt which fastens the knife clamp 132 against the knife 130. In one possible alternative implementation, the chipper attachment can include a counter-knife 73 positioned between the chipper knife 130 and knife support block 114.

The knife support receiving area 124 is also relatively flat and faces substantially in the direction of rotation 80 of the rotor assembly. The support receiving area is designed to mate with and receive a knife support block 114. The knife support block 114 is held flush against the support receiving area 124 by a fastener 136 such as a threaded bolt 136 as shown.

The hog machine is converted into a chipper by sliding the mounting pins 86–88 from the rotor assembly 70 and attaching interchangeable chipper attachments such as 72a, 72b, 72c, and 72d to the mounting pins 86–88. The mounting pins are pushed back through the chipper attachments 72a–d and rigidly fasten them to the rotor assembly between adjacent rotor members.

When operated as a chipper, the radial distance between the tip 140 of the chipper knife and opposing anvil edge 142 are more critical in the formation of wood chips. In this particular design, therefore, the hog/chipper machine has an adjustable anvil assembly 76 so that an operator can adjust and accurately set the cutting tolerances (radial distance between the tip of the chipper knife and opposing anvil edge). The anvil assembly 76 shown in FIG. 3 includes an anvil support body 150, an anvil plate 152, and an anvil clamp 154 to hold the anvil plate 152 firmly against the anvil body 150. The anvil plate is adjustable by loosening the fasteners 156, 158 that hold the anvil plate 152 in place, sliding the anvil plate 152 closer or farther from the axis of the rotor, and then re-tightening the fasteners to secure the anvil place. Alternatively, the anvil plate can be replaced with another plate of a different size. In the design shown here, the fasteners in the anvil assembly are threaded bolts 156, 158 that are easy to screw and unscrew. An operator of the machine can partially loosen the bolts and slide the anvil plate 152 in a radial direction 126 relative to the axis of the rotor assembly 70.

Figure 4:
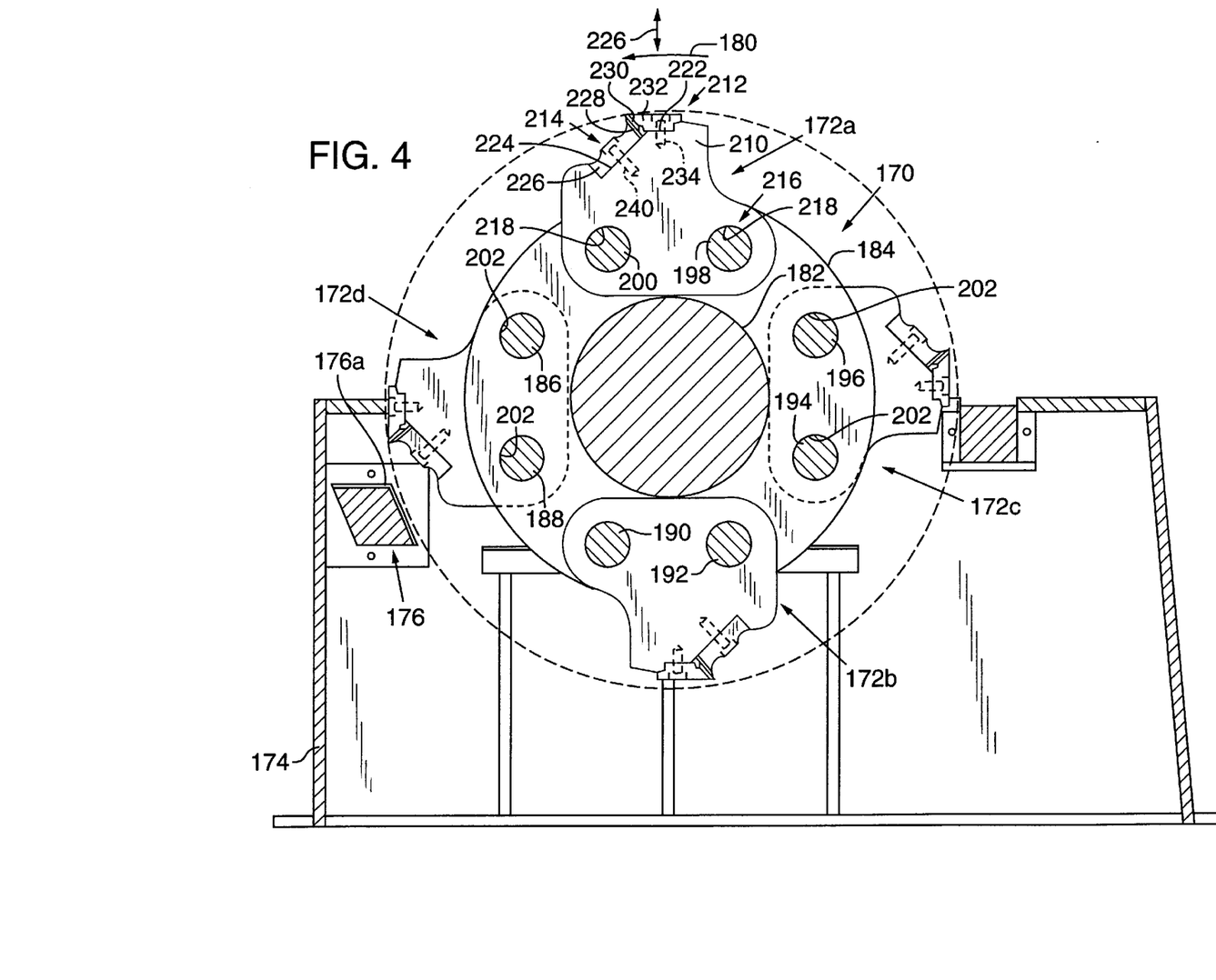
FIG. 4 is a cross-sectional view of an alternative embodiment using interchangeable chipper attachments.

FIG. 4 illustrates a cross-sectional view of an alternative embodiment of an interchangeable chipper attachment 172a–d. Like the hog in FIG. 3, the hog shown in FIG. 4 has a similar design as the one shown in FIGS. I and 2. It includes a housing 174, which partially encloses a rotor assembly 170. The contact area 176a of an anvil assembly 176 faces in a direction that opposes the direction of rotation 180 of the rotor assembly 170. The rotor assembly 170 includes a shaft 182, and a rotor members (e.g., 184) that mount on the shaft 182. Mounting pins 186–200 slide through the mounting holes on the rotor members and are aligned in a direction parallel to the axis of rotation of the rotor. In this implementation, the rotor members 184 have eight mounting holes (202, for example) corresponding to the eight mounting pins. In place of the hammer tools shown in FIGS. 1 and 2, the converted chipper machine has two or more chipper cutting attachments 172a–d coupled between a pair of adjacent rotor members via the mounting pins (190, 192, 198, and 200, for example). The chipper attachments between adjacent rotor members are positioned on opposite sides of the rotor assembly to balance the rotor assembly.

The chipper cutting attachments 172a–d each comprise a tool holder 210, a knife assembly 212, and a knife support block 214. A tool holder 210 has a fastener portion 216 for rigidly and removably attaching the tool holder to the rotor assembly 170. In this particular embodiment, the fastener portion 216 comprises first and second holes or slots 218, 220 that allow the mounting pins 186, 188 of the rotor member 184 to slide through. The specific shape and configuration of the fastener portion 216 can vary, as long as the tool holder is held rigidly in place on the rotor assembly during operation and can be removed from the rotor member 184 to interchange the tool holder 210.

Each of the tool holders shown in FIG. 4 have a knife receiving area 222 and a knife support receiving area 224. The knife receiving area 222 forms a relatively flat surface that faces substantially in the radial direction 226 of the rotor assembly 170. As opposed to the cutting attachment in FIG. 3, the knife receiving area 222 nearly faces in the radial direction 226 relative to the axis of rotation of the shaft (i.e., is substantially tangential to an arc of rotation). The specific cross-sectional shape of the tool holder can vary as long as it accommodates the positioning of the chipper knife relative to the anvil so that the hog operates as a chipper with this attachment. The knife receiving area 222 is shaped to receive and retain a knife assembly 212 in a cutting position.

In this particular embodiment, the knife assembly 212 includes a chipper knife 230, a knife clamp 232, and a fastener 234 such as a threaded bolt which fastens the knife clamp 232 against the knife receiving area 222. The knife clamp 232 holds the knife 230 by friction against the knife support block 226.

The knife support receiving area 224 is also relatively flat and faces substantially in the direction of rotation of the rotor assembly 170. The support receiving area 224 is designed to mate with and receive a knife support block 226. A counter-knife 228 is positioned between the knife support block 226 and the knife 230 and is located at the opposite side of the knife from the knife clamp 232. The knife support block 226 is held substantially flush against the support receiving area 224 by a fastener 240 such as a threaded bolt 240 as shown.

Figures 5, 6, 7, 8, 9:
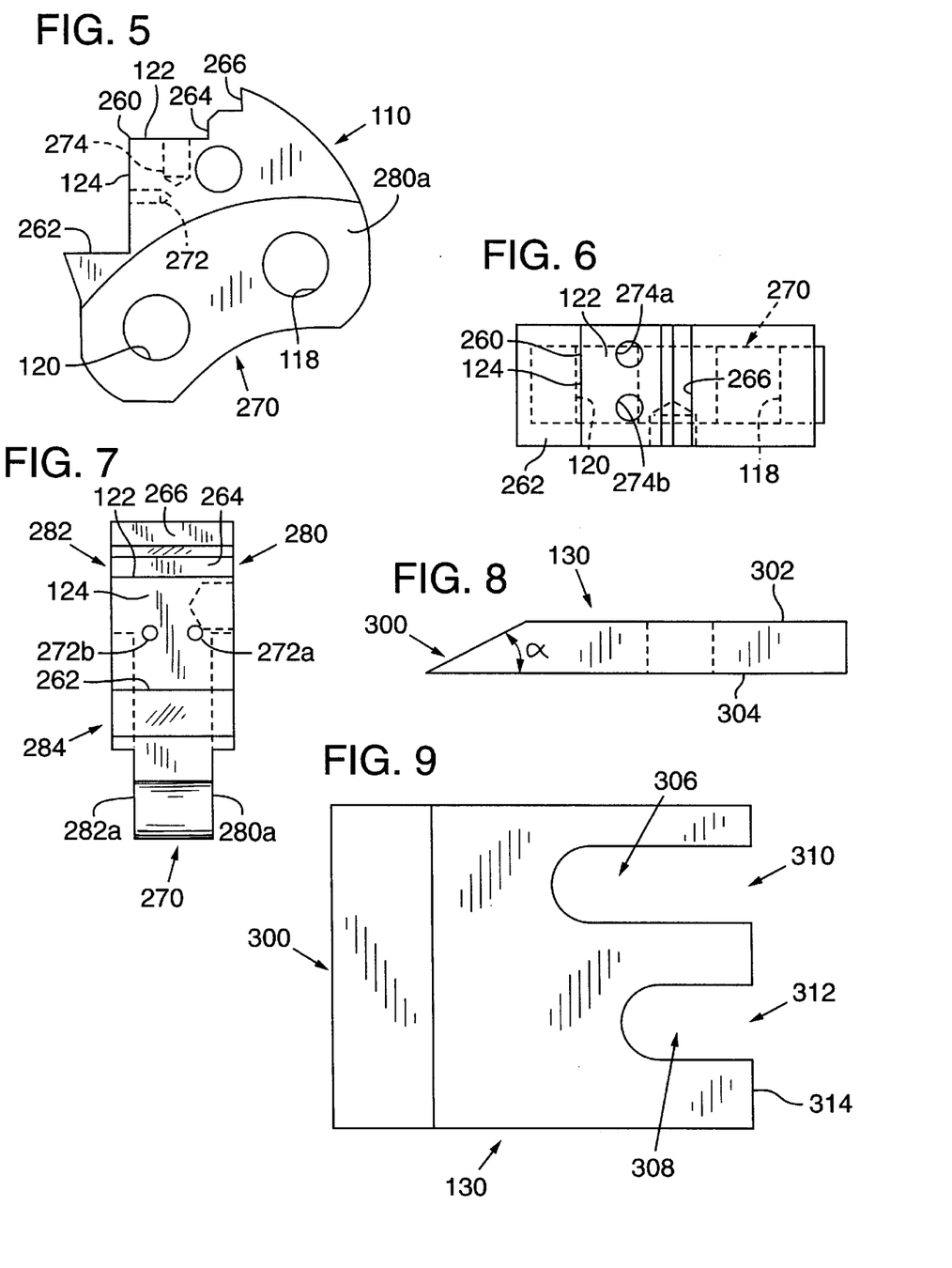
FIG. 5 is a side elevation view of a tool holder in the interchangeable chipper attachment shown in FIG. 3.
FIG. 6 is a top plan view of the tool holder shown in FIG. 5.
FIG. 7 illustrates a front elevation view of the tool holder in FIG. 5.
FIG. 8 is a side view of a knife blade for the chipper attachment of FIG. 3.
FIG. 9 is a top view of the knife of FIG. 8.

FIG. 5 is a side view of the tool holder 72 in the interchangeable chipper attachment shown in FIG. 3. As shown, the knife receiving area 122 and knife support receiving area 124 are substantially perpendicular to each other in this embodiment. The knife receiving area 122 and the knife support receiving area 124 share a common edge 260 at the point where the knife and knife support meet. On the opposite side of the knife receiving area 122 from this common edge 260, the tool holder is shaped to match the contour of the knife support block. Specifically, the lateral face of the tool holder is substantially perpendicular to the knife support receiving area on the side opposite the common edge 260. This lateral face forms a support block wall 262 at the knife support receiving area 124, and the support block fits between this wall 262 and the knife. The knife support receiving area has threaded holes 272, which are used to fasten the knife support block to the knife support receiving area.

The knife receiving area 122 is shaped to match the shape of the knife assembly. For example, the lateral wall 264 opposite the edge 260 of the knife receiving area is shaped to receive the knife assembly. Specifically in this embodiment, the lateral wall 264 is substantially perpendicular to the surface of the knife receiving area 122. At the far side of the lateral wall 264 relative to the knife receiving area, the side profile of the tool holder is angled and then forms a pocket 266 for receiving and supporting the knife clamp block. Like the knife support block, the knife receiving area has threaded holes 274, which are used to fasten the knife assembly to the knife receiving area 122.

It is important to note that the specific shape of the tool holder at the knife receiving area 122 and the knife support receiving area 124 can vary depending on the shape and size of the knife assembly 112 and knife support block 114. In general, the tool holder 110 is shaped to mate with the knife support block 114 (FIG. 3, for example) and knife assembly 112 so that the knife 130 and knife support 114 remain firmly in place during operation, and the knife support provides support to the knife 130. The chipper attachment may also include a counter-knife positioned between the knife 130 and knife support 114.

The tool holder 210 in FIG. 4 has a somewhat similar design in that the knife support block 214 and knife assembly 212 mate with the contour of the tool holder 172 so that the knife assembly 212 and knife support block 214 are positioned adjacent to each other at the common edge 260 of the knife receiving area 222 and knife support receiving area 224. Both the knife assembly and the knife support block mate with and are held in place by the contour of the lateral faces formed into the tool holder.

The rotor assembly portion 270 of the chipper attachment in FIG. 5 is shaped to match the curvature of the rotor member in the rotor assembly. Similarly, the mounting holes are positioned to correspond to the arrangement of the mounting pins in the rotor assembly 70 (FIG. 3). The specific design of the rotor assembly side can vary as demonstrated by the alternative tool holder design in FIG. 4. The tool holder in FIG. 4 does not have a concave curvature like the tool holder in FIGS. 3 and FIG. 5, but does have some form of a fastener portion such as mounting holes 218, 220 which correspond to the rotor member of the rotor assembly.

FIG. 6 is a top view of the tool holder shown in FIG. 5. This view shows two threaded holes 274a and 274b used to fasten the knife clamp and knife to the knife receiving area. This view also shows the support block wall 262, knife receiving area 122, and pocket 266 for the knife clamp in more detail. The reference numerals shown in FIG. 6 correspond to the reference numerals for the same elements shown on the tool holder 110 in FIGS. 3 and 5.

FIG. 7 is a front side view of the tool holder in FIG. 5. This view reveals the opposing faces of the tool holder (the right face 280 and the left face 282). The right face 280 is the side exposed in the side view of FIG. 5. As shown in FIG. 3, the opposing faces of the tool holder are substantially perpendicular to the axis of rotation of the rotor assembly (i.e., they face in the axial direction). The rotor assembly portion 270 of the tool holder is slightly recessed relative to the main body 284 of the tool holder at faces 280a and 282a. This view shows the positioning of the threaded holes 272a–b for fastening the support block 114 to the support receiving area 124. From this view, one can also see the knife face 264 and the pocket 266 for the knife clamp. In this particular embodiment, the thickness of the tool holder is approximately 4 inches at the main body 284 and about 2.5 inches at the rotor assembly portion 270 due to the recessed faces. While the precise dimensions of the tool holder can vary, it is important to keep in mind that the tool holder is designed to slide on and off of the pins on the rotor assembly and to be interleaved between rotor members on the rotor assembly. As such, the thickness of the tool holder should enable an operator to install and remove a tool holder and allow two or more layers of cutting attachments to be stacked longitudinally along the axis of the rotor assembly. In the illustrated design, the recessed rotor assembly portion enables the adjacent layers of cutting attachments to be closer together.

FIG. 8 illustrates a side view of a knife 130 for the chipper attachment of FIG. 3. The cutting blade portion 300 of the knife forms an angle $\alpha$ of about 27 degrees in this particular embodiment, and the knife is about 5 inches long and ⅝ inch thick. The top face 302 of the knife is designed to be adjacent to the knife clamp, while the bottom face 304 is designed to fit against the knife receiving area 122 of the tool holder 110 shown in FIG. 5.

From the top view of FIG. 9, one can see that the knife blade 300 extends the entire width of the knife 130. The knife 130 has a fastener portion designed to fasten it to the tool holder. In this particular embodiment the fastener portion comprises first and second slots 306, 308 which form openings 310, 312 at the lateral edge 314 of the knife opposite the knife blade 300. It is not critical to have a fastener portion in the form of a slot in the knife because there are alternative ways to fasten the knife blade to the tool holder, such as fastening a bolt or bolts through a hole or holes in the knife 130. The design illustrated in FIG. 9 allows an operator to adjust the knife relative to the anvil (namely, increase or decrease the distance from the tip of the blade 300 to the edge of the anvil). The two slots enable the clamp to hold the knife in place more rigidly and prevent it from twisting or rotating about the axis of the bolts that hold the clamp against the knife.

Figure 10:
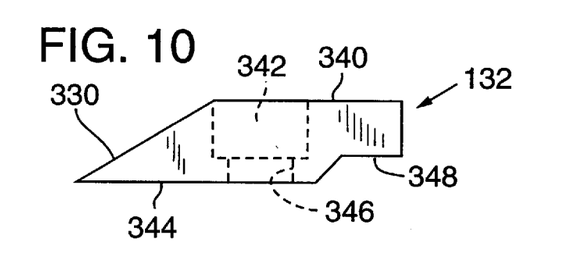
FIG. 10 is a side view of a knife clamp for the chipper attachment of FIG. 3.

FIG. 10 shows a side view of a knife clamp 132 for the chipper attachment of FIG. 3. As shown, this embodiment has a leading edge with an angled profile 330 so that the clamp can fit over the knife yet prevent the chipper attachment from making contact with the inner wall of the hog housing 74. The top side 340 of the clamp has a larger opening 342 for the head of bolt to pass through, while the bottom side 344 of the clamp has a smaller opening 346 that allows the stem of the bolt to pass through but retains the head. The bottom side also has a recessed surface 348 designed to mate with the pocket 266 of the tool holder. The recessed surface allows the clamp to hold knifes of different thicknesses firmly against the knife receiving area of the tool holder.

Figure 11:
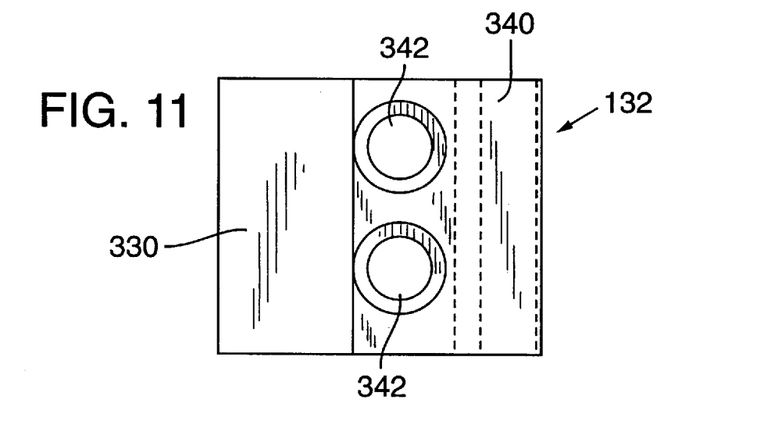
FIG. 11 is a top view of the knife clamp of FIG. 10.

FIG. 11 is a top view of the knife clamp 132 shown in FIG. 10. The top view reveals two holes 342 for bolts to tighten the clamp against the knife blade. These bolts pass through the slots in the knife blade and engage the threads in the holes of tool holder body at the knife receiving area. The specific design of the knife clamp can vary as illustrated by the alternative knife clamp implementations 132, 232 in FIGS. 3 and 4. The knife clamp 132 shown here retains a chipper knife 130 against the knife receiving area 122, while the knife clamp 232 in FIG. 4 retains a different type of chipper knife 230 against the knife support block 214. In both cases, the knife clamp fastens the chipper knife to the tool holder and is adjustable so that the position of knife can be adjusted.

Figure 12:
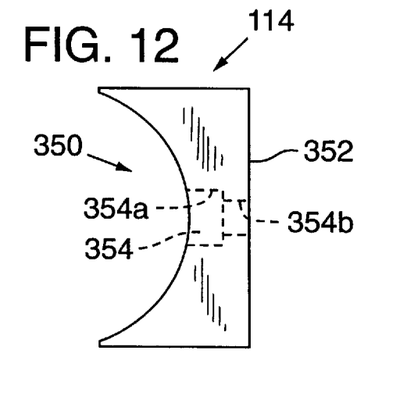
FIG. 12 is a side view of a knife support block for the chipper attachment of FIG. 3.

FIG. 12 is a side view of a knife support block 114 for the chipper attachment of FIG. 3. The outer face 350 of the knife support block is concave in this embodiment. The inner face 352 is relatively flat and mates with the support block receiving area 124 on the tool holder. The fastener for the support block comprises a hole 354 through the support block with a slightly larger opening 354*a* on the outer face than the opening 354*b* on the inner face to match the head of a bolt.

Figure 13:
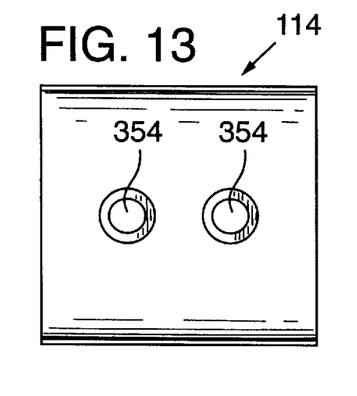
FIG. 13 is a face elevation view of the knife support block of FIG. 12.

FIG. 13 is a face view of the knife support block 114 of FIG. 12. This view shows that the support block in this embodiment has two bolt receiving holes or apertures 354. The use of two holes allows bolts to hold the support block in place more rigidly because it prevents the block from pivoting or rotating. As shown by the support block 214 in FIG. 4, the specific shape of the support block on the chipper tool attachment can vary. However, the support blocks 114, 214 in FIGS. 3 and 4 both support the chipper knife in a similar way.

While we have described the invention with reference to specific embodiments, it is important to emphasize that the invention is not limited to the specific embodiments illustrated and described here. For example, the specific configuration of the fastener portion, knife receiving area and knife support area of the tool holders shown in FIGS. 4 and 5 can vary. In addition, the tool holder can be coupled to the rotor assembly in alternative ways, and the specific structure of the rotor assembly can vary from one hog machine to the next. While the two pin hole mounting approach is perhaps the most typical, other mounting approaches can be used as well.

In view of the many possible embodiments to which the principles of our invention may be applied, it should be recognized that the illustrated embodiment is only a preferred example of the invention and should not be taken as a limitation on the scope of the invention. Rather, the scope of the invention is defined by the following claims. We therefore claim as our invention all that comes within the scope and spirit of these claims.

We claim:

1. A hog machine converted to a chipper machine by an interchangeable chipper tool attachment, the hog machine comprising:

a rotor assembly positioned within a housing, comprising a plurality of axially disassembleable rotor members;

a plurality of interchangeable chipper tool attachments coupled to the rotor members, wherein a chipper tool attachment comprises:

a tool holder having first and second faces on opposing sides of the tool holder, a knife receiving area positioned between the opposing sides of the tool holder and facing in substantially perpendicular directions to the opposing faces, and a fastener portion for rigidly and removably attaching the tool holder to the rotor assembly such that the opposing faces of the tool holder are substantially perpendicular to an axis of rotation of the rotor assembly; and a knife assembly coupled to the knife receiving area.

2. The converted chipper machine of claim 1 wherein the tool holder includes a support block receiving area positioned between the opposing sides of the tool holder and facing in substantially perpendicular directions to the opposing faces; and the chipper tool attachment comprises a knife support block coupled to the support block receiving area.

3. The machine of claim 1 further comprising:

an adjustable anvil that is adjustable to move closer to or farther from a path of the chipper knife as it rotates in the converted hog machine.

4. The machine of claim 1 wherein the rotor members are stacked axially along the axis of rotation of the rotor assembly and the tool holders are interleaved between adjacent rotor members.

5. The machine of claim 4 wherein a plurality of tool holders are slidably engaged to the rotor assembly between the adjacent rotor members on mounting pins in the rotor assembly.

6. The machine of claim 1 wherein the tool holder is adapted to be slidably attachable to and detachable from the rotor assembly by an operator.

7. The machine of claim 1 wherein the fastener portion comprises two slots or holes for rigidly coupling the tool holder to the rotor assembly.

8. The machine of claim 1 wherein the knife assembly includes a knife clamp and a knife, and the knife is removably fastened between the knife clamp and the knife receiving area.

9. The machine of claim 2 wherein the knife assembly includes a knife clamp and a knife, and the knife is removably fastened between the knife clamp and the knife support block.

10. The machine of claim 1 wherein the knife assembly includes a chipper knife with a knife blade, and wherein the chipper knife is adjustable by an operator relative to an edge of an anvil in the hog.

11. The machine of claim 2 wherein the knife support block is removably coupled to the support block receiving area by a fastener that is detachable and attachable by an operator.

12. The machine of claim 1 wherein the tool holder is adapted to be slidably attached to and detached from the rotor assembly;

wherein the fastener portion comprises two slots or holes for rigidly coupling the tool holder to the rotor assembly;

wherein the knife assembly includes a knife clamp and a knife, and the knife is removably fastened to the tool holder by the knife clamp and is adjustable relative to an edge of an anvil in the hog.

* * * * *